(12) United States Patent
Cheriton

(10) Patent No.: US 7,779,126 B1
(45) Date of Patent: *Aug. 17, 2010

(54) SYSTEM AND METHOD FOR PROPAGATING FILTERS

(75) Inventor: David Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/395,329

(22) Filed: Mar. 31, 2006

Related U.S. Application Data

(63) Continuation of application No. 09/698,968, filed on Oct. 26, 2000, now Pat. No. 7,054,930.

(51) Int. Cl.
*G06F 15/173* (2006.01)
*H04N 7/12* (2006.01)

(52) U.S. Cl. .................... 709/226; 375/204.09

(58) Field of Classification Search ............... 709/206; 375/204.29
See application file for complete search history.

(56) References Cited

U.S. PATENT DOCUMENTS

| | | | |
|---|---|---|---|
| 5,828,833 A * | 10/1998 | Belville et al. ............ 726/11 |
| 5,883,901 A | 3/1999 | Chiu et al. |
| 5,968,176 A | 10/1999 | Nessett et al. |
| 6,098,172 A * | 8/2000 | Coss et al. ................ 726/11 |
| 6,119,236 A * | 9/2000 | Shipley .................... 726/22 |
| 6,128,298 A | 10/2000 | Wootton et al. |
| 6,138,162 A * | 10/2000 | Pistriotto et al. ........... 709/229 |
| 6,141,686 A | 10/2000 | Jackowski et al. |
| 6,243,667 B1 | 6/2001 | Kerr et al. |
| 6,304,973 B1 * | 10/2001 | Williams ................ 726/3 |
| 6,345,299 B2 * | 2/2002 | Segal .................... 709/229 |
| 6,393,474 B1 | 5/2002 | Eichert et al. |
| 6,496,935 B1 * | 12/2002 | Fink et al. ............... 726/13 |
| 6,502,131 B1 | 12/2002 | Vaid et al. |
| 6,578,076 B1 | 6/2003 | Putzolu |
| 6,636,524 B1 | 10/2003 | Chen et al. |
| 6,647,413 B1 | 11/2003 | Walrand et al. |
| 6,665,725 B1 | 12/2003 | Dietz et al. |
| 6,735,702 B1 * | 5/2004 | Yavatkar et al. ........... 726/13 |
| 6,832,256 B1 | 12/2004 | Toga |
| 7,051,365 B1 * | 5/2006 | Bellovin ................ 726/11 |
| 2001/0014912 A1 * | 8/2001 | Segal .................... 709/223 |
| 2002/0032717 A1 * | 3/2002 | Malan et al. ............ 709/105 |
| 2002/0073337 A1 * | 6/2002 | Ioele et al. ............. 713/201 |
| 2003/0165140 A1 | 9/2003 | Tang et al. |

OTHER PUBLICATIONS

Smith, Robert N. "A Protocol and Simulation for Distributed Communicating Firewalls", Year 1999, IEEE Computer Society, COMPSAC 23rd International Computer Software and Applications Conference, pp. 74-79.*

* cited by examiner

*Primary Examiner*—Jeffrey Pwu
*Assistant Examiner*—Guang Li
(74) *Attorney, Agent, or Firm*—Cindy Kaplan

(57) ABSTRACT

A method and system for propagating filters to an upstream device. The method includes generating a filter at a first network device and sending information on the filter to a second network device located upstream from the first network device. The first network device then requests the second network device to install the filter.

27 Claims, 7 Drawing Sheets

SYSTEM AND METHOD FOR PROPAGATING FILTERS

RELATED APPLICATION

This patent application is a continuation of U.S. patent application Ser. No. 09/698,968, filed Oct. 26, 2000, which is incorporated herein by reference in its entirety.

BACKGROUND OF THE INVENTION

The present invention relates generally to filtering data in high-speed computer networks, and more specifically, to the generation and refinement of filters.

In the connected world of the Internet, destructive individuals can create major network security problems for administrators with systems exposed to public networks. The recent denial of service attacks on many of the web's most popular sites makes this clearer than ever before. A denial of service attack occurs when a malicious attacker sends continuous TCP/IP packets to a server, which quickly take up resources until there are no more resources available and a system hang or crash occurs. Commonly the targeted site may appear unavailable to the broader Internet because of the saturation of its network segment. Denial of service attacks can result in significant loss of time and money for many organizations.

Denial of service attacks are different from most other attacks because they are not targeted at gaining access to a network or information on the network. These attacks focus on making a service unavailable for normal use, which may be accomplished by exhausting some resource limitation on the network or within an operating system or application. Denial of service attacks are most frequently executed against network connectivity. The goal is to prevent hosts or networks from communicating on the network. There are several types of denial of service attacks, which can occur at various levels. When involving specific network server applications, such as a Hypertext Transfer Protocol (HTTP) server or a File Transfer Protocol (FTP) server, these attacks can focus on acquiring and keeping open all of the available connections supported by that server, effectively locking out valid users of the server or service. Denial of service attacks can also be implemented using other Internet protocols, such as UDP and Internet Control Message Protocol (ICMP).

The most common denial of service attack is the SYN attack. This is a network level attack. The attacker sends continuous TCP SYN packets to a server. Each TCP SYN packet creates a new connection record until there are no more TCP resources available. The attacker begins the process of establishing a connection to the victim machine, but does it in such a way as to prevent the ultimate completion of the connection. In the meantime, the victim machine has reserved one of a limited number of data structures required to complete the impending connection. The result is that legitimate connections are denied while the victim machine is waiting to complete phony "half-open" connections. This type of attack does not depend on the attacker being able to consume network bandwidth. The intruder may be consuming kernel data structures involved in establishing a network connection. The implication is that an intruder can execute this attack from a dial-up connection against a machine on a very fast network.

High-speed networks make detecting and responding to certain types of failures and attacks difficult. The high speed makes it difficult to carefully examine every packet or even maintain state and monitor the state of every data steam without extensive hardware support. For example, a 50 MPPS switch may receive over one million flow streams per second, producing a logging data rate of 20 megabytes per second with just a 20 byte record per flow. This rate of log data is expensive to store in hardware and practically impossible to process in software. Monitoring only a subset of the traffic results in holes in detection and provides no defense against problems that exceed this subset capacity.

A more common approach is to use aggregate traffic monitoring and policing. For example, a server switch may rate limit ICMP traffic arriving on an external port to a predetermined maximum rate rather than preclude it altogether. However, an attack or a failure using ICMP may use up the entire rate, effectively blocking out other ICMP traffic, with no mechanism to determine what is causing the problem. The offending or suspicious data is therefore hidden in the aggregate. Furthermore, a high-rate attack or failure can originate upstream of a device experiencing the problem, thus compromising use of the associated link even if the device can filter out the traffic.

SUMMARY OF THE INVENTION

A method and system for propagating filters to an upstream device are disclosed. In one aspect of the invention, a method includes generating a filter at a first network device and sending information on the filter to a second network device located upstream from the first network device. The method further includes requesting the second network device to install the filter.

The filter may be generated at the first network device based on network flow entering the device, for example. The first network device may receive information from the upstream device based on monitored network flow. The filter may be removed from the first network device when the network flow requiring the filter is no longer present.

A computer program product for propagating a filter to an upstream device generally comprises code that generates a filter at a first network device, code that sends information on the filter to a second network device located upstream from the first network device, and code that requests the second network device to install the filter. The product further includes a computer-readable storage medium for storing the codes.

A system for propagating filters to an upstream device generally comprises means for generating a filter at a first network device, means for sending information on the filter to a second network device located upstream from the first network device, and means for requesting the second network device to install the filter.

In another aspect of the invention, a method for installing filters on connected network devices includes analyzing network flows received at a first device and generating a filter at a second network device based on the analyzed flows. The method further includes propagating the filter from the second network device to the first network device.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
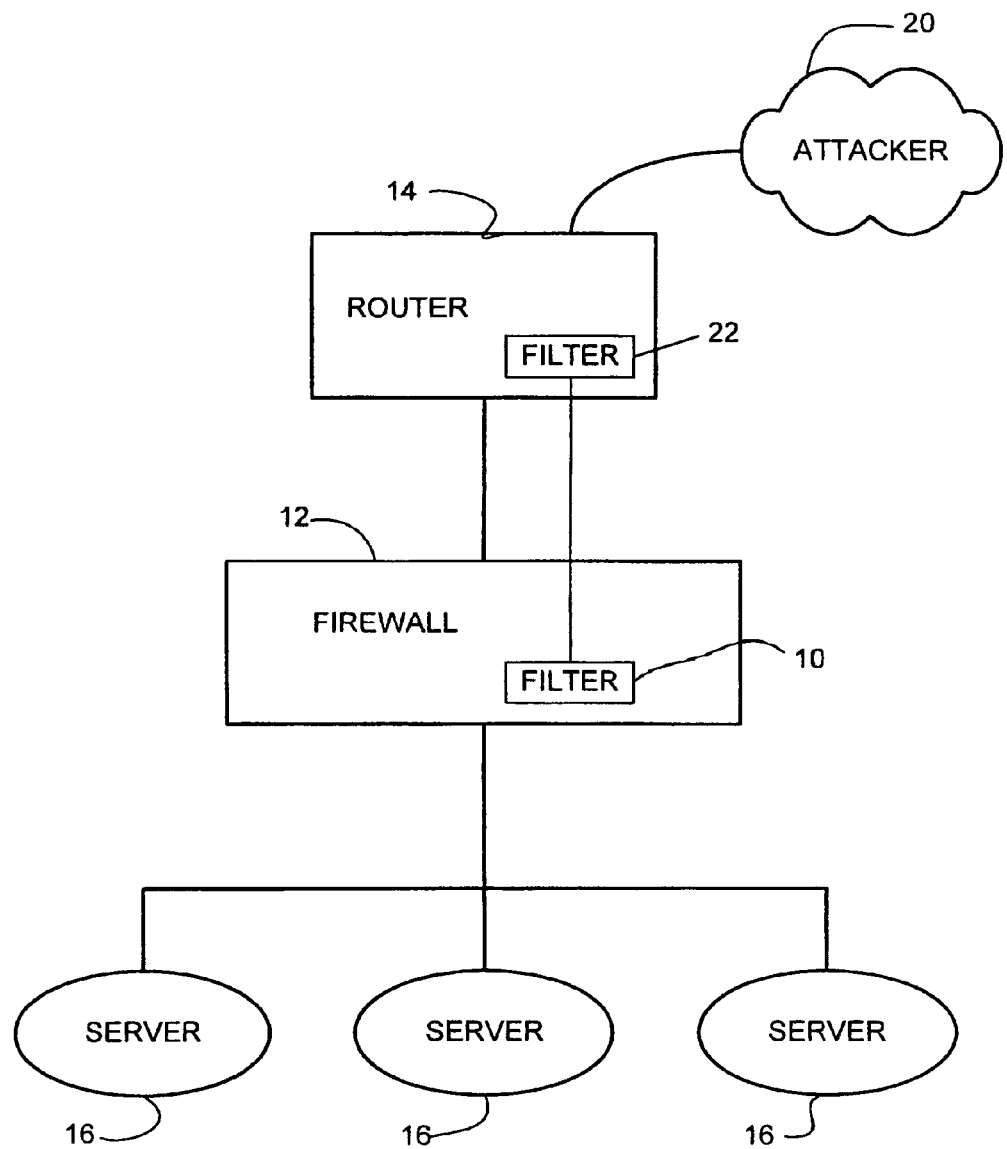
FIG. 1 is a diagram illustrating a firewall located between a router and a plurality of servers with an attacker sending data into the router.

Referring now to the drawings, and first to FIG. 1, a filter 10 is shown inserted into a firewall 12 located between a router 14 and a plurality of servers 16. An attacker 20 is shown positioned to transmit harmful packets to the router 14. A system of the present invention propagates filter information to filter harmful data closer to the source. As described below, the system may use an inter-router filter propagation protocol (FPP) to automatically propagate filter information upstream to filter data closer to the source of the data, as illustrated by filter 22 located at router 14. In one embodiment, a netflow directory and flow analyzer are used to detect harmful network flows which may include denial of service attacks or merely a high rate of data coming into the system which needs to be filtered to reduce the possibility of problems within the network. The filter 10 may be progressively refined to identify detailed characteristics of packets involved in an attack or failure. The filter information may then be sent to the upstream device 14 to refine its filters 22.

The present invention operates in the context of a data communication network including multiple network elements. Some of the nodes in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM and/or ROM. However, there are many different ways in which memory may be coupled to the system. In an alternative embodiment, a router or switch may be implemented on a general purpose network host machine such as the computer system shown in the block diagram of FIG. 2.

Figure 2:
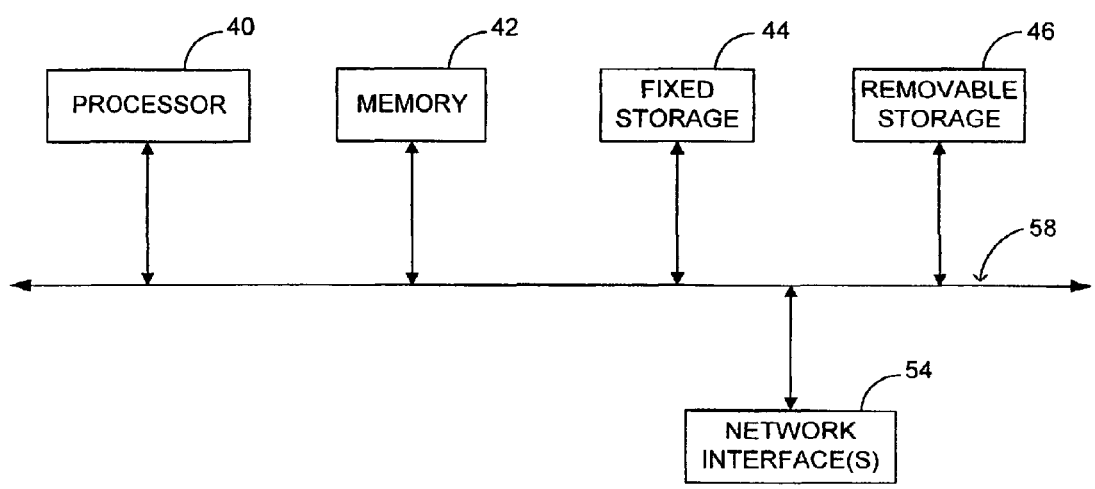
FIG. 2 is a diagram illustrating a logical architecture of a computer system that may be used to execute software of this invention.

FIG. 2 shows a system block diagram of a computer system that may be used to execute software of an embodiment of the invention. The computer system may include subsystems such as a central processor 40, system memory 42, removable storage 46 (e.g., CD-ROM drive), one or more network interfaces 54, and a hard drive 44 which can be utilized to store and retrieve software programs incorporating computer code that implements aspects of the invention, data for use with the invention, and the like. The computer readable storage may also include tape, flash memory, or system memory. Additionally, a data signal embodied in a carrier wave (e.g., in a network including the Internet) may be the computer readable storage medium. The computer system may further include a display screen, keyboard, and mouse which may include one or more buttons for interacting with a GUI (Graphical User Interface). Other computer systems suitable for use with the invention may include additional or fewer subsystems. For example, the computer system may include more than one processor 40 (i.e., a multi-processor system) or a cache memory.

The system bus architecture of the computer system is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces, for example. The inside interface will be connected to a private network, while the outside interface will be connected to an external network such as the Internet. Preferably, each of these interfaces includes a plurality of ports appropriate for communication with the appropriate media, and associated logic, and in some instances memory. The associated logic may control such communication intensive tasks as packet integrity checking and media control and management. The high speed interfaces are preferably multiport Ethernet interfaces, but may be other appropriate interfaces such as FDDI interfaces.

Referring again to FIG. 1, the firewall 12 is located between the router 14 and the plurality of servers 16. The router 14 may be an Internet Service Provider (ISP) router, for example. It is to be understood that the system and method of the present invention may also be used in networks which are not connected to the Internet.

The firewall 12 is a system or group of systems that enforce a security policy between an organization's network and the Internet. The firewall 12 determines which inside services may be accessed from the outside, which outsiders are permitted access to the inside services, and which outside services may be accessed by insiders. For the firewall 12 to be effective, all traffic to and from the Internet must pass through the firewall, where it can be inspected. The firewall 12 permits only authorized traffic to pass, thus providing a perimeter form of defense for securing network access. The firewall 12 may be configured, for example, to allow specific IP source addresses to access specific IP destination addresses, or only allow HTTP packets and not allow TELNET or FTP. The firewall 12 is preferably a packet filtering firewall but may also be a proxy (application) firewall.

Once the initial filters 10 are defined within the firewall 12, the system may be used to automatically propagate filter information upstream to filter data closer to the source, such as filter 22 located at router 14 shown in FIG. 1. For example, an enterprise switch may identify excessive traffic as coming from a particular source subnet or host and communicate this upstream to a router, requesting the router to automatically install a filter for this traffic. The filter 22 prevents excessive traffic from monopolizing a potentially slower tail circuit to the enterprise, just to be discarded at that point. The downstream device 12 is able to receive statistics from the upstream device 14 for the specific filter 22 that it requested, determine that the traffic requiring the filter is no longer present, and remove this upstream filter. An inter-switch/router filter propagation protocol (FPP) is used to create, remove, monitor, and modify filters 10, 22 between devices. FPP preferably uses negative routing (i.e., it indicates what traffic not to forward). The upstream node 14 receives the negative routing information from the downstream node 12 and then refines the filter 22 and puts it in a place such that it only affects traffic that it would forward to the requesting downstream node. That is, a node does not (and cannot) request filtering of traffic to other nodes. This limits FPP's use by an attacker as a means for carrying out a denial of service attack. The upstream node maintains a packet and byte count of packets received that match the filter and are thus dropped. FPP provides an operation to request these statistics from the upstream node and optionally extend the lifetime of the filter. For example, the downstream device 12 can request that the upstream device 14 filter out or deny all HTTP/TCP traffic with source address matching 36.131.0.14. If the upstream device 14 does not have such a filter, it creates one if possible. Otherwise, it extends the time out on the current filter which otherwise serves to remove the filter in the absence of communication from the downstream device 12. The upstream device 14 then returns an indication of whether it has such a filter installed and the byte and packet count statistics on this filter if so. In order to reduce hardware filters or to minimize the performance impact with a software filter mechanism, the downstream node 12 may uninstall or reduce the filters locally that are made unnecessary by the filters installed in the upstream node 14.

The filter 22 may be removed after a specified time period during which the downstream node 12 has not requested extension of this filter or the downstream node explicitly requests removal of the filter. FPP preferably follows the type-length-value (TLV) structure of protocols such as BGP, and is designed to run over TCP, for example. It is to be understood that other transports and representation may be used for FPP without departing from the scope of the invention.

The upstream device 14 can limit the filters that a downstream device can specify using the FPP to those affecting the traffic that the downstream device 12 is to receive, based on local routing information. The upstream device 14 can further limit the total number of such filters the downstream device 12 can request, encouraging the downstream device to use this limited resource effectively. It can also refine these filters to match just that traffic destined for the requesting downstream device. For example, a downstream device on subnet 171.172.X.X. can request a filter on HTTP traffic from source network 36.131.X.X. The upstream device 14 can enter the filter to match on SA 36.131.X.X. and DA 171.172.X.X so that the filter (policer) does not affect traffic from this source to other subnets connecting to the same upstream device. It can also require the downstream device 12 to actively subscribe to each such filter, so that the upstream device can reclaim these filters easily if the downstream node reboots and forgets the requested filter information.

By using filters in several different devices (e.g., switches, routers) effectively pushing back upstream towards the sources, the total number of filters available to react against an attack can be substantially more than that supported by a single device. This multi-hop filter propagation also has the benefit of allowing an ISP router, for example, to automatically block the traffic at a peering point that is simply going to be dropped, rather than transporting it across the ISPs backbone just to be dropped. The peering ISP can then back-propagate these filters itself to drop the traffic sooner, and in the extreme, use it as a basis to shut down or investigate an offending source. The filters may also be used to block potentially harmful packet types through certain ports.

Figure 3:
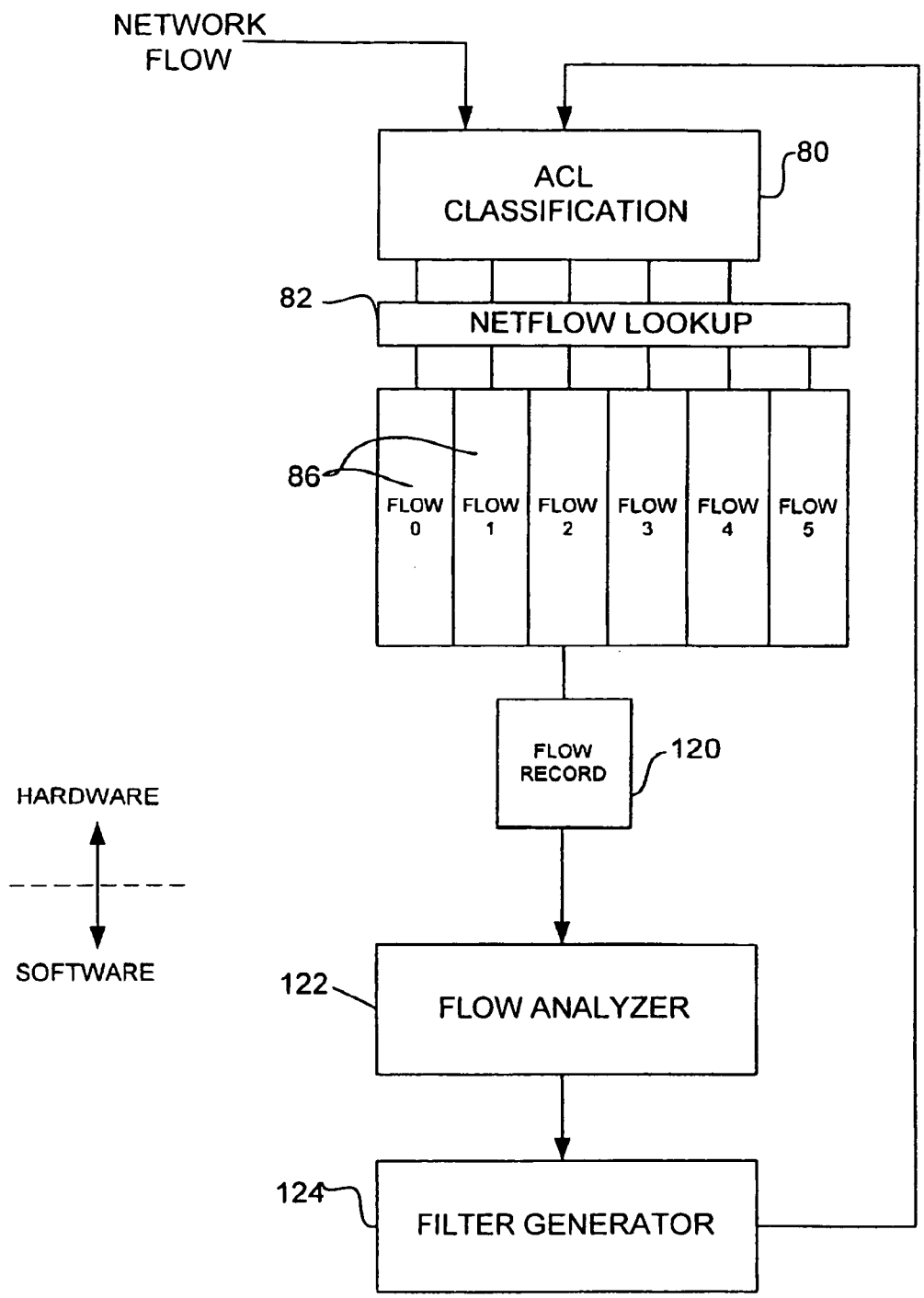
FIG. 3 is a diagram illustrating a system of the present invention for analyzing data transmitted to the firewall of FIG. 1 and generating a filter for the firewall.

The filter may be selected based on analyzed network flows. FIG. 3 illustrates a netflow directory of microflows which may be used to analyze high speed data entering the router 14 or firewall 12 to identify detailed characteristics of packets involved in an attack or a failure. The netflow mechanism is configured to create network flows for those matching specified aggregate filters as described below. Also included is a means for determining the specific flows created by the netflow mechanism and the aggregate filter responsible for the creation of each specific flow. The netflow mechanism may be, for example, a network flow switching and flow data export system such as disclosed in U.S. patent application Ser. No. 08/886,900, filed Jul. 2, 1997, which is incorporated herein by reference in its entirety.

Figure 4:
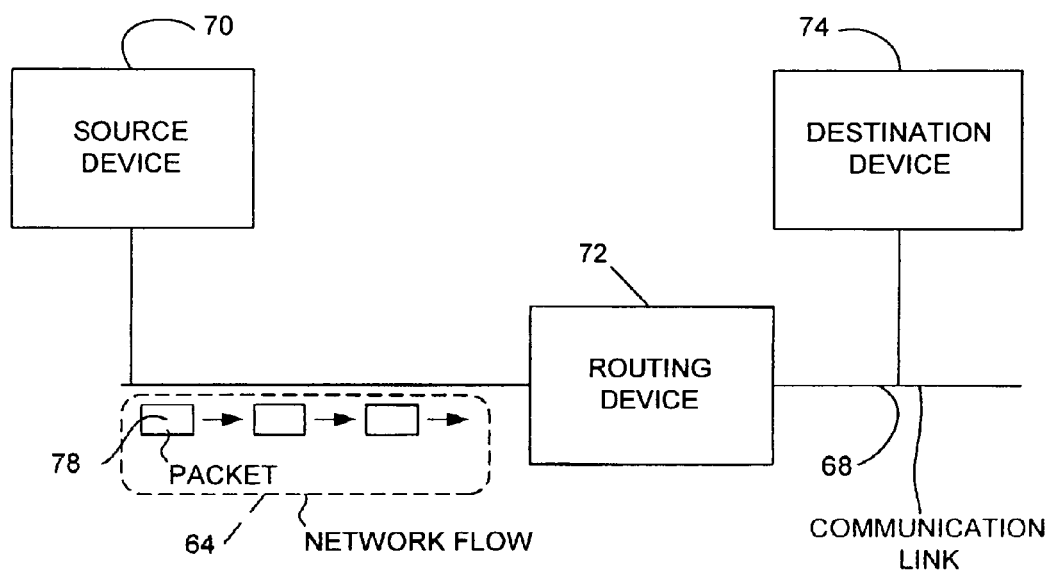
FIG. 4 is a diagram of a network illustrating network flow on a communication link.

FIG. 4 shows a network flow 64 on communication link 68 connecting a source device 70, a routing device 72 and a destination device 74. The network flow 64 consists of a unidirectional stream of packets 78 to be transmitted between pairs of transport service access points. The network flow 64 thus, broadly refers to a logical communication circuit between communication endpoints. The source device 70 may be the attacker 20, the routing device may be the ISP router 14 or firewall 12, and the destination device may be one of the plurality of servers 16 shown in FIG. 1. The communication link 68 may comprise any form of physical media layer such as Ethernet, FDDI, or HDLC serial link. The routing device 72 may include specific hardware constructed or programmed for performing process steps described below, a general purpose processor operating under program control, or some combination thereof.

Data is received from the source device 70 in network flow 64 which is defined by a network layer address for the source device, a port number at the source device, a network layer address for the destination device 74, a port number at the destination device, and a transmission protocol. For example, HTTP (Hypertext Transfer Protocol) web packets from a particular source host to a particular destination host constitute a separate flow from FTP (File Transfer Protocol) file transfer packets between the same pair of hosts. The transmission protocol type may identify a known transmission protocol, such as UDP, TCP, ICMP, or IGMP (Internet Group Management Protocol). The source device 70 may be identified by its IP (Internet Protocol) address, for example. The port number at the source device is identified by either a port number which is specific to a particular process, or by a standard port number for the particular transmission protocol type.

As shown in FIG. 3, packets 78 within the network flow 64 are first sent to an ACL (Access Control List) classification device 80. The ACL classification device 80 is configured to classify the received packets 78. The flow may be classified, for example, by source node (IP address), destination node (IP address), detail destination node (destination address, source TCP/UDP port, destination TCP/UDP port, protocol), host matrix (source address/destination address pair), detail host matrix (source/destination address, port, protocol), source TCP/UDP (transportation layer source port), destination TCP/UDP port (transport layer destination port), protocol (protocol name), detail interface (input-output physical interface pair), or some combination thereof.

Security (ACL) processing may be applied only to the first packet 78 of a network flow 64. For example, the ACL processing may determine whether or not to build a netflow entry on the first packet, and subsequent packets may bypass the ACL processing. Information from the first packet 78 is used to build an entry in a netflow cache. Subsequent packets in the flow are handled via a single streamlined task that handles data collection. After packets 78 pass through the ACL classification device 80, the packets are sent to a netflow lookup device 82 which separates the streams into a plurality of flows (or bucket) 86. Each bucket includes a set of entries, each entry including information about a particular network flow 64. The netflow mechanism maintains the flow cache by removing entries for network flows which are inactive or no longer considered valid.

Figure 5:
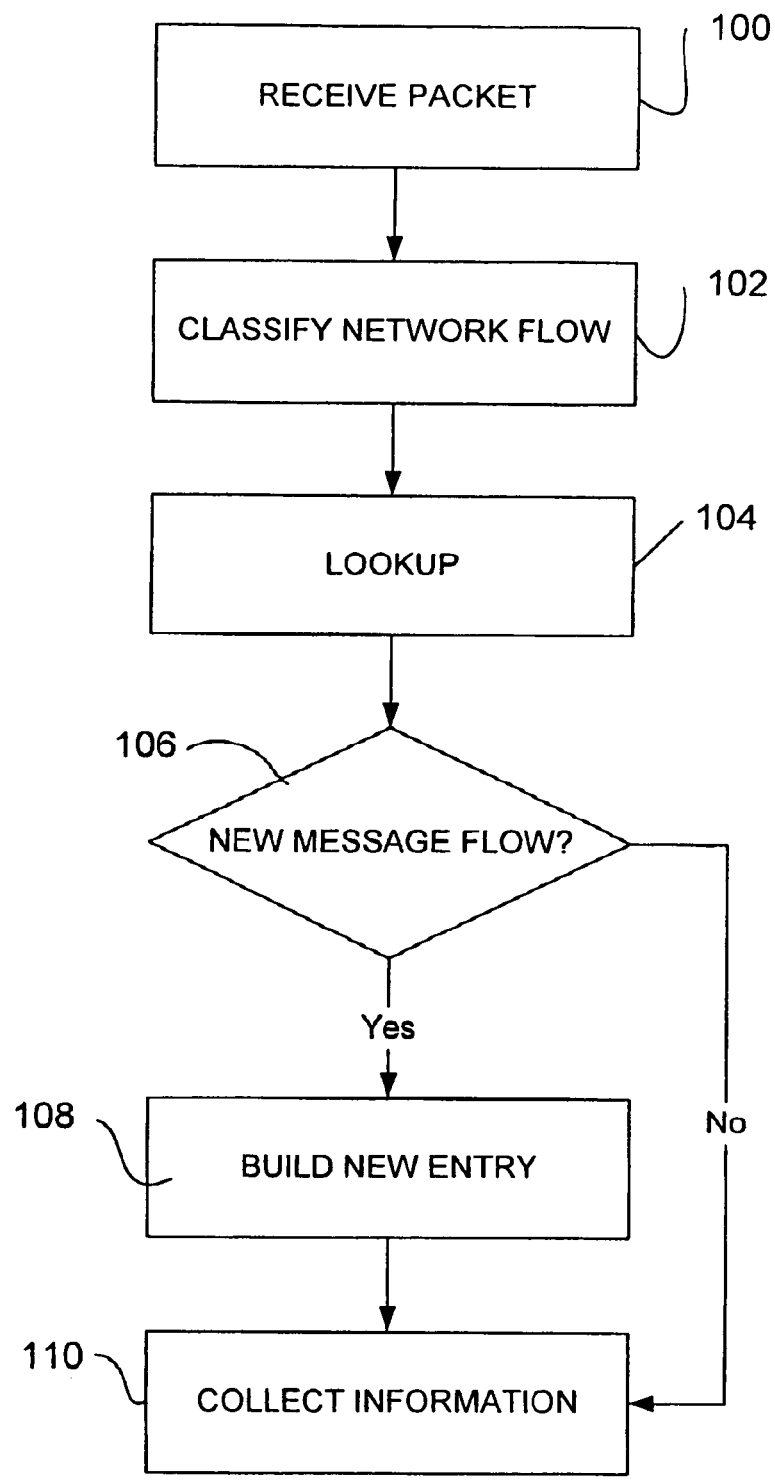
FIG. 5 is a flowchart illustrating a process for classifying and analyzing network flows in a netflow directory.

FIG. 5 is a flowchart illustrating a process for analyzing packets utilizing the netflow directory. A packet 78 is first received at the ACL classifier 80 (step 100). The ACL classifier 80 may examine a header of the packet 78 and identify the IP address for the source device, the IP address for the destination device, and the protocol type for the packet, for example, to classify the packet (step 102). The ACL classifier 80 then selects a flow column 86 for the network flow 64. Based on the results of the classification, the netflow lookup device 82 may perform a lookup in the flow cache for the identified network flow (step 104). If the lookup is unsuccessful, the identified network flow 64 is a new network flow and the netflow mechanism may build a new entry in the flow cache (step 106). The proper treatment of packets in the network flow is determined, for example, from the classification (steps 106 and 108). The netflow mechanism then proceeds at step 110, using the information from the new entry in the flow cache, just as if the identified network flow were an old network flow. If the lookup is successful, the identified network flow 64 is an old network flow and the lookup device 82 continues with step 110. Since the netflow mechanism processes each packet 78 in the network flow 64 responsive to the entry for the network flow in the flow cache, the netflow mechanism is able to implement administrative policies which are designated for each network flow rather than for each packet. Thus, the network flows are analyzed and information on incoming packets is provided without examining each packet received in the flow analyzer 122. This flow collection aggregation allows for data to be stored by aggregate summary records instead of raw data records.

Once the flow 64 passes through the netflow directory, flow records 120 are created that provide information about a particular network flow (FIG. 3). The flow record 120 may include, for example, information about packets 78 in particular network flows 64, including source address, port number, and protocol type, or other information relevant to diagnosing actual or potential network problems including attacks on the network. Since the amount of information from the high speed data is reduced in hardware by the netflow mechanism to a reasonable amount of data, the flow records 120 can now be analyzed by software. The flow records 120 are sent to a flow analyzer 122 where the flows are analyzed to identify characteristics of packets 78 involved in an attack or a failure. For example, if a large number of SYN packets or an unusual distribution of packets is identified as coming from a source (e.g., attacker 20), it is likely that the source is involved in an attack. The attacker may first be identified as an organization such as a university, business, or an ISP, for example. However, it is likely that there is only one source within the organization that is sending harmful packets. Once a group of packets 78 are identified as harmful, the corresponding network flows 64 can be analyzed to further refine the filter. Therefore, instead of filtering out all data arriving from the identified organization, only the destructive packets received from the actual attacker are dropped.

Figure 6:
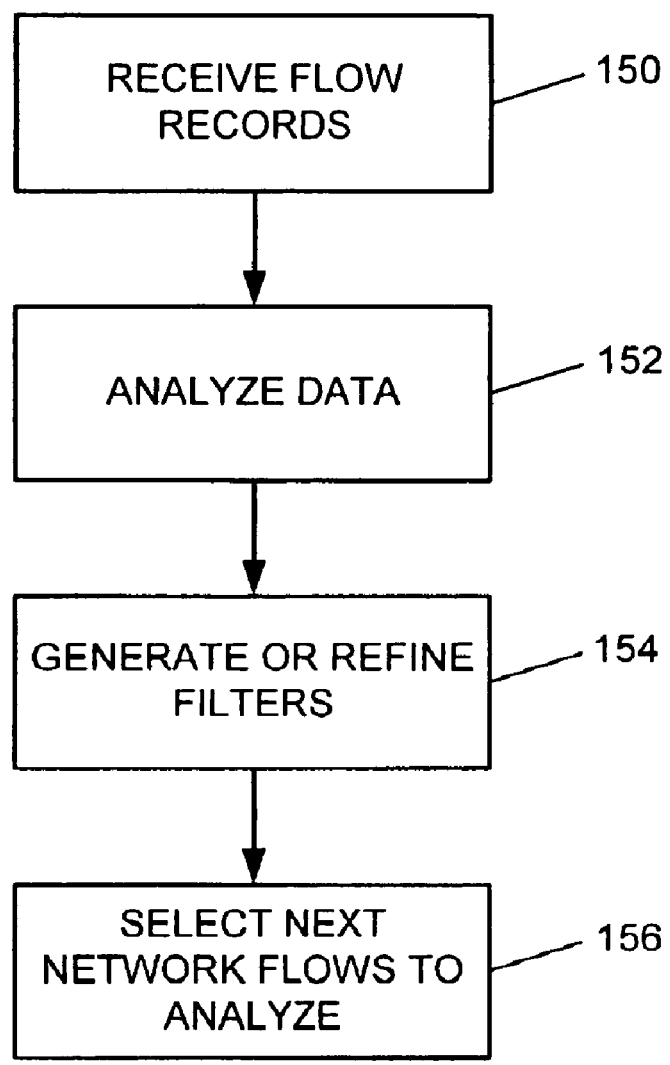
FIG. 6 is a flowchart illustrating a process of the present invention for refining filters to identify characteristics of packets involved in an attack or failure.

FIG. 6 is a flowchart illustrating a process performed by the flow analyzer 122 and flow generator 124. The first records 120 are first received by the flow analyzer 122 at step 150. The flow analyzer 122 then analyzes data received at step 152. For example, the flow analyzer 122 may check for an excessive number of SYN packets relative to the amount of data packets received. The filter generator 124 next generates or refines filters (step 154). For example, after detecting an excessive number of SYN packets from a source subnetwork, it may refine the filters to subsets of hosts in that subnet or even specific individual source host addresses. The filter generator 124 then selects the next group of network flows to be analyzed and passes this information to the ACL classifier 80 (step 156).

Figure 7:
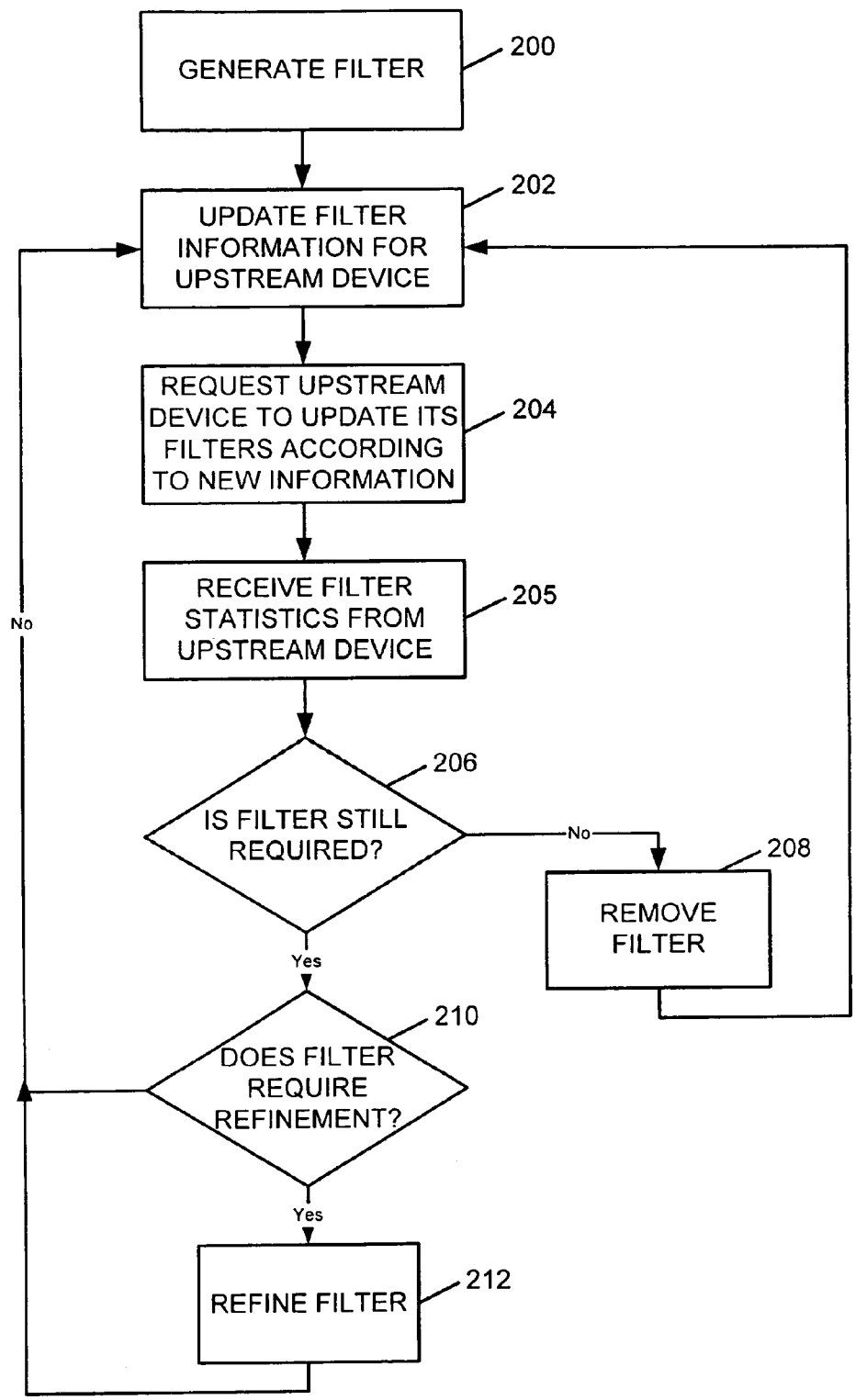
FIG. 7 is a flowchart illustrating a process of the present invention for propagating filters to an upstream device.

FIG. 7 is a flowchart illustrating a process for propagating the filter 10 to an upstream device (e.g., router 14). At step 200 the filter 10 is generated. The filter 10 may be generated using the system shown in FIG. 3, for example. It is to be understood that systems and methods different than those shown and described herein may be used to generate the filter 10 without departing from the scope of the invention. For example, a filter may be manually generated by the operator. Information on the filter 10 is sent to the router 14 using a filter propagation protocol (FPP), as previously described. The filter information is updated at step 202. The router 14 is requested to update filter 22 to filters at step 204. After router 14 installs filter 22, firewall 12 periodically requests reinstallation of filter 22 at router 14 using FPP, causing router 14 to extend the lifetime of this filter and return packet and byte count statistics for this filter. The downstream device receives filter statistics from upstream device at step 205. This is necessary because the downstream device will not see the traffic at the filters once they are installed at the upstream device. If the filter is no longer required it is removed (steps 206 and 208). If the potentially harmful network flows are no longer entering the router 14, the filters 10 and 22 can be removed. The device 12 containing filter 10 sends a message to the router 14 to remove or refine the filter 22 as required (steps 210-212). The message may be sent using the FPP described above. The downstream device continues to update filter information for upstream device. This extends the lifetime of existing filters and results in filters being reinstalled at the upstream device if it crashed and forgot the filters. It is to be understood that the steps of sending filter information to the upstream device and requesting the device to install the filter may be accomplished in one message transmission. For example, a packet may be sent instructing the device to install a filter with specified parameters.

The initial class of packets 78 to be analyzed is selected based on statistics associated with the aggregate filters, as described below. The data which is to be analyzed is periodically changed or updated to further refine a filter once it has been generated. For example, a first class of packets 78 may be analyzed for 0.5 second then a next class of packets analyzed for the next 0.5 seconds. The initial filters 10 may be configured according to user specified configurations or default values. The flow analyzer 122 and filter generator 124 then use the analyzed flow to determine if the existing filters need to be refined or new filters need to be generated. Based on the analyzed flow, the filter generator 124 will tell (or modify) the ACL classifier 80, which then affects the netflow entries that are created. The class of packets 78 selected may be based on a class of packets which have been identified as potentially harmful, or may be randomly chosen. The ACL classifier 80 may, for example, begin by looking at flows 64 for all packets 78 received from a source with an IP address having the form 3.xxx.xxx.xxx, where xxx represents any possible value from zero to 255. If a problem is identified in one of the packets streams 64, the ACL classifier 80 may be then instructed to look at flows for all packets 78 received from a source having an IP address of 3.141.xxx.xxx. This may be narrowed down further to refine the filter 10.

The flow analyzer 122 monitors the statistics associated with these aggregate filters 10. If the statistics associated with an aggregate filter entry indicate a potential problem (or just as a periodic check of the traffic distribution), creation of netflow entries is enabled for packets matching this entry. Consequently, the flow analyzer 122 receives a flow record 120 for each flow matching this aggregate. Using this specific flow information, the flow generator 124 determines how to refine the aggregate filter. For example, the flow label information may indicate that most ICMP packets are coming from a particular source address. In this case, the flow generator 124 can configure an aggregate filter 10 that matches ICMP packets from that source, establishing a separate policer for that filter or potentially just blocking the source. The original aggregate filter is preferably retained as well so that all other ICMP traffic matches to this original filter. The flow analyzer 122 can then monitor the statistics of the original aggregate filter with the offending host removed, to detect whether there are further anomalies within the aggregate flow.

The flow analyzer 122 may also be configured to recognize that the total rate of traffic matching an aggregate value may far exceed its ability to sample by examining the statistics for the entry. For example, the total port traffic into a web server may be too much to handle. In this case, the aggregate filters can be split into multiple subaggregates based on some quasi-random distinction. It may use, for example, four aggregate filters that select different traffic based on the lower-order two bits of the IP source address for the packets 78. The flow analyzer 122 then samples using the netflow directory for each of the four aggregate filters in sequence.

The filters 10 may be refined to recognize either that the rate of packets 78 itself is a problem or else allow these packets to be redirected to the flow analyzer 122 for more careful examination, such as to identify specific aspects of an attack or failure. When such examination is in use, the filters 10 can employ a rate-limiting policer to prevent software from being overwhelmed.

The system shown in FIG. 3 may also be used to automatically recognize further structure to network traffic that does not necessarily represent an attack or a failure. For example, a web server may receive an excessive level of traffic from a search engine spider or an upstream web cache. By automatically detecting a high demand source of this nature, the filter generator 124 can automatically reconfigure the filters 10 to handle this demand. For example, a policy may indicate a maximum aggregate rate of HTTP traffic of 100 Mpbs and a maximum rate from any source of 25 Mbps. Rather than explicitly policing every flow, the system can be used to identify sources that appear to represent excessive traffic, allowing aggregate filters to be created that separate them out of the overall aggregate and throttle their traffic appropriately. These filters 10 can also be automatically removed when the associated traffic drops off, based on the statistics associated with the identified flow. Thus, for example, once a search engine finishes its searching at a web site, the filter 10 created for it indicates that traffic has dropped because of the lower rate and the specific filter can be reclaimed.

Reverse path forwarding (RPF) may be used to attempt to prevent source spoofing. Effective filtering of attackers depends on the prevention of the attacker from spoofing other source addresses that are not registered for use by this attacking node. RPF check can be used to detect and drop packets corresponding to source spoofing provided that the routing topology is restricted, such as largely hierarchical. RPF check may be used in cases where attacks and failures are a concern, with certain network topologies being preferred or avoided to make this as enforceable as possible. That is, configurations where traffic can simultaneously arrive at a switch from a given source from multiple input ports or VLANs is avoided. RPF is an input function applied on the input interface of a router at the upstream end of a connection. RPF checks to see if any packet received at a router interface arrives on one of the best return paths to the source of the packet. RPF does a reverse lookup in a forwarding table. If the packet was received from one the best reverse path routes, the packet is forwarded as normal. If there is no reverse path route on the same interface from which the packet was received, the source address may have been modified or forged.

Source spoofing can also be prevented by ingress filtering at Internet Service Providers (ISPs). In this approach, each ISP filters the source addresses used by its customers so that each customer can only use an address as a source address in packets that are actually allocated to that customer. Assuming that means to prevent arbitrary source address spoofing is deployed, the automatic progressive filter refinement can respond automatically to denial of service attacks allowing the sites to effectively respond in seconds or less, rather than hours, even with a distributed denial of service attack. The attacking sources can be quickly identified and filters propagated on this traffic upstream and locally. The filter can be adapted to new sources as the attack moves.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for propagating filters in a network comprising a first network device and a second network device, said second network device located upstream of said first network device such that network traffic passes through said second network device before arriving at said first network device, the method comprising:
   generating and installing a first filter at said first network device;
   sending filter information from said first network device to said second network device;
   requesting said second network device to install a second filter so that said network traffic is filtered closer to a source of said network traffic, said second filter configured to filter said network traffic forwarded to said first network device without filtering traffic to other downstream nodes;
   receiving filter statistics from said second network device at said first network device;
   analyzing said filter statistics and said network traffic received from said second network device at said first network device, refining said first filter based on said analyzed filter statistics, and sending updated filter information to said second network device so that said second network device can refine said second filter installed thereon; and
   removing said first filter from the first network device and sending a request to said second network device to remove said second filter, if a network flow requiring said filter is no longer present based on said received filter statistics.

2. The method of claim 1 wherein generating a filter at a first network device comprises automatically generating said first filter based on network flow entering the device.

3. The method of claim 1 further comprising requesting said upstream device to remove said second filter, wherein requesting comprises transmitting a message utilizing an inter-switch filter propagation protocol.

4. The method of claim 1 wherein sending filter information comprises utilizing a filter propagation protocol configured to specify the network traffic that is not to be forwarded.

5. The method of claim 1 wherein generating said first filter comprises detecting potentially harmful network flows and generating said first filter to prevent packets corresponding to said detected potentially harmful network flows from passing through said network device.

6. The method of claim 5 wherein generating said first filter further comprises classifying network flow based on a source device sending a packet.

7. The method of claim 6 wherein the network flow is classified based on an address of the source device.

8. The method of claim 1 wherein generating said first filter comprises analyzing network flow entering said first network device.

9. The method of claim 8 wherein analyzing said network flow is performed by software.

10. The method of claim 8 comprising selecting a class of network flows to analyze based on previously analyzed network flows.

11. A computer readable storage medium encoded with a computer program for propagating a filter in a network comprising a first network device and a second network device, said second network device located upstream of said first network device such that network traffic passes through said second network device before arriving at said first network device, the computer program comprising:
   code that generates and installs a first filter at said first network device;
   code that sends filter information to said second network device;
   code that requests said second network device to install a second filter so that said network traffic is filtered closer to a source of said network traffic, said second filter configured to filter said network traffic forwarded to said first network device without filtering traffic to other downstream nodes;
   code that receives filter statistics from said second network device at said first network device;
   code that analyzes said filter statistics and said network traffic received from said second network device at said first network device, refines said first filter based on said analyzed filter statistics, and sends updated filter information to said second network device so that said second network device can refine said second filter installed thereon; and
   code that removes said first filter from the first network device and sends a request to said second network device to remove said second filter, if a network flow requiring said filter is no longer present based on said received filter statistics.

12. The computer readable storage medium of claim 11 wherein code that generates said first filter comprises code that classifies network flow based on a source device sending a packet.

13. The computer readable storage medium of claim 11 wherein code that generates said first filter comprises code that analyzes network flows and detects potentially harmful network flows.

14. The computer readable storage medium of claim 11 further comprising code that removes said first filter from the first network device when no longer required.

15. The computer readable storage medium of claim 14 further comprising code that requests said upstream device to remove said second filter.

16. The computer readable storage medium of claim 11 further comprising code that utilizes a filter propagation protocol to exchange information between said first and second network devices.

17. A system for propagating filters in a network comprising a first network device and a second network device, said second network device located upstream of said first network device such that network traffic passes through said second network device before arriving at said first network device, the system comprising:
   means for generating and installing a first filter at said first network device;
   means for sending filter information from said first network device to said second network device;
   means for requesting said second network device to install a second filter so that said network traffic is filtered closer to a source of said network traffic, said second filter configured to filter said network traffic forwarded to said first network device without filtering traffic to other downstream nodes;
   means for receiving filter statistics from said second network device at said first network device;
   means for analyzing said filter statistics and said network traffic received from said second network device at said first network device, refining said first filter based on said analyzed filter statistics, and sending updated filter information to said second network device so that said second network device can refine said second filter installed thereon; and means for removing said first filter from the first network device and sending a request to said second network device to remove said second filter, if a network flow requiring said filter is no longer present based on said received filter statistics.

18. The system of claim 17 wherein means for generating said first filter comprises automatically generating said first filter based on network flow entering the device.

19. The system of claim 17 further comprising means for receiving information based on monitored network flow and means for removing said first filter from the first network device when the network flow requiring said filter is no longer present.

20. The system of claim 19 further comprising means for requesting said upstream device to remove said second filter.

21. The system of claim 17 wherein the first network device is a firewall and the second network device is a router.

22. Apparatus for propagating filters in a network comprising a first network device and a second network device, said second network device located upstream of said first network device such that network traffic passes through said second network device before arriving at said first network device, the system comprising:
   one or more processors; and
   a memory that stores instructions to be executed by said one or more processors, said instructions comprising:
   code that generates and installs a first filter at said first network device;
   code that sends filter information from said first network device to said second network device;
   code that requests said second network device to install a second filter so that said network traffic is filtered closer to a source of said network traffic, said second filter configured to filter traffic forwarded to said first network device without filtering traffic to other downstream nodes;
   code that receives filter statistics from said second network device at said first network device;
   code that analyzes said filter statistics and said network traffic received from said second network device at said first network device, refines said first filter based on said analyzed filter statistics, and sends updated filter information to said second network device so that said second network device can refine said second filter installed thereon; and
   code that removes said first filter from the first network device and sends a request to said second network device to remove said second filter, if a network flow requiring said filter is no longer present based on said received filter statistics.

23. The apparatus of claim 22 wherein code that generates said first filter comprises code that classifies network flow based on a source device sending a packet.

24. The apparatus of claim 22 wherein the code that generates said first filter comprises code that analyzes network flows and detects potentially harmful network flows.

25. The apparatus of claim 22 further comprising code that removes said first filter from the first network device when no longer required.

26. The apparatus of claim 25 further comprising code that requests said upstream device to remove said second filter.

27. The apparatus of claim 22 further comprising code that utilizes a filter propagation protocol to exchange information between said first and second network devices.

* * * * *